J. P. OCKERSHAUSEN.
Sugar-Cutting Machine.

No. 160,945. Patented March 16, 1875.

UNITED STATES PATENT OFFICE.

GEORGE P. OCKERSHAUSEN, OF NEW YORK, N. Y.

IMPROVEMENT IN SUGAR-CUTTING MACHINES.

Specification forming part of Letters Patent No. 160,945, dated March 16, 1875; application filed February 2, 1875.

*To all whom it may concern:*

Be it known that I, GEORGE P. OCKERSHAUSEN, of the city, county, and State of New York, have invented certain new and useful Improvements in Machines for Cutting Sugar; and I do hereby declare that the following is a full, clear, and exact description of the same, reference being had to the accompanying drawing, forming part of this specification, and in which—

Figure 1:
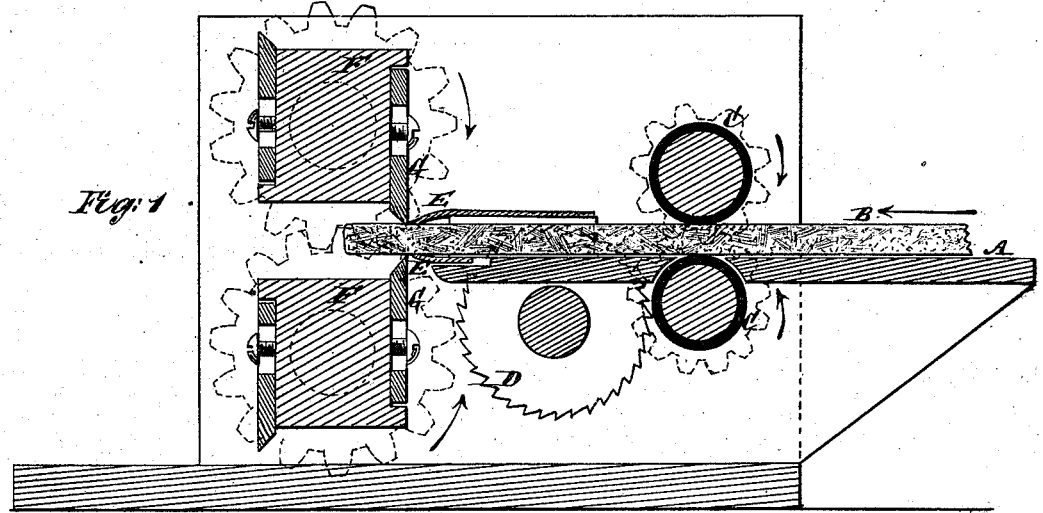
Figure 2:
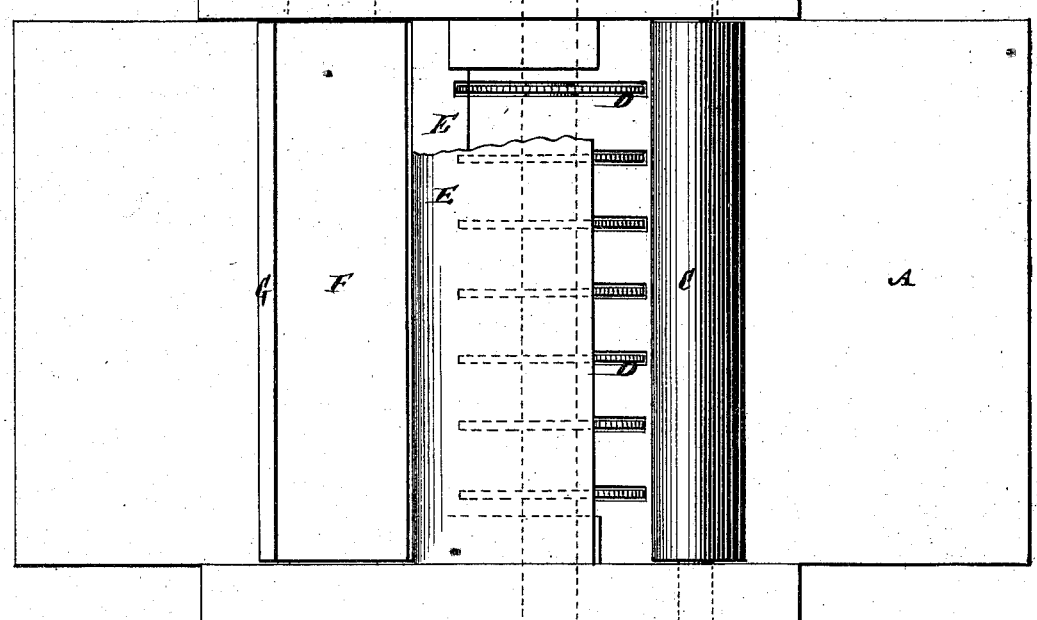

Figure 1 represents a vertical section of a machine constructed in accordance with my invention, and Fig. 2 a plan of the same.

This invention relates to the manufacture of cut loaf-sugar from slabs, into which it is formed either by molding or otherwise.

The object of this invention is to cut these slabs into sticks, and subsequently to cut the latter into cubes or blocks. To this end the invention consists in a certain combination of elastic jaws, elastic feed-rollers, and saws for presenting and holding the slab while it is being cut up into sticks; also, in a novel construction of cutter-heads with their cutters for cutting or nipping the sticks of sugar into cubes, and in a combination of elastic jaws for holding the sticks with revolving cutters having tangential cutters, for operation upon the sticks in close proximity to the jaws, and in transverse relation with the feed.

A is the bed, over which the slab B of sugar is passed to or between india-rubber rolls C C, that feed the slab to and over a gang of circular saws, D D, which cut the slab into sticks. E E are elastic plate-like jaws, constructed to bear in a yielding manner, both above and below, on the sugar or cut sticks in rear of the same. Said sticks are cross-cut to form cubes or blocks, as they emerge from the jaws, by revolving cutter-heads F F, moving, as regards their contiguous surfaces, in the same direction and in line with the feed.

These cutter-heads may be of any desired shape in their transverse section, and may carry any number of cutters, but the same number each, and so that they operate simultaneously on opposite sides of the sticks, or above and below the latter—that is, each cutter in succession of the two heads. To this end, and to secure a straight or nipping action, as in the case of hand sugar-nippers, the cutters G G are tangentially arranged in relation with their heads, and so that they cut back of the centers of the latter close or in proximity to the elastic jaws E E, and when or as two corresponding cutters of the two heads lie in the same plane, or thereabout, parallel with and in advance of said cutters, reaching a plane which intersects the centers of the two heads. In this way or by these means the sticks are nipped into cubes or blocks in a regular and easy manner during a continuous feed of the sugar under a soft or yielding hold of it.

Any suitable gearing may be employed for driving the feed-rolls, the saws, and the nipping or cross-severing cutters.

I claim—

1. The combination of the elastic jaws E E with the elastic feed-rollers C C and the saws D D, substantially as specified.

2. The revolving cutter-heads F F, provided with tangential cutters G G, disposed to cut in a plane back of and parallel, or thereabout, with a plane intersecting the centers of the heads, substantially as described.

3. The combination, with the elastic jaws E E, of the revolving cutter-heads F F, having tangential cutters G G, as and for the purposes herein set forth.

GEORGE P. OCKERSHAUSEN.

Witnesses:
BENJ. W. HOFFMAN.
MICHAEL RYAN.